US009189555B2

(12) United States Patent
Pretti et al.

(10) Patent No.: US 9,189,555 B2
(45) Date of Patent: Nov. 17, 2015

(54) DISPLAYING CUSTOMIZED LIST OF LINKS TO CONTENT USING CLIENT-SIDE PROCESSING

(75) Inventors: Stephen Pretti, Downington, PA (US); Wilbur Goldschmidt, Boyertown, PA (US); Katie Wilson, Philadelphia, PA (US); Eric Stuehrmann, Cochranville, PA (US)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 459 days.

(21) Appl. No.: 13/606,779

(22) Filed: Sep. 7, 2012

(65) Prior Publication Data

US 2014/0075276 A1    Mar. 13, 2014

(51) Int. Cl.
*G06F 17/22*    (2006.01)
*G06F 17/30*    (2006.01)

(52) U.S. Cl.
CPC ............................. *G06F 17/30867* (2013.01)

(58) Field of Classification Search
CPC .................................................. G06F 17/2235
USPC .......................................................... 715/205
See application file for complete search history.

(56) References Cited

U.S. PATENT DOCUMENTS

| | | | | |
|---|---|---|---|---|
| 6,263,360 B1* | 7/2001 | Arnold | ...................... | G06F 8/65 707/999.01 |
| 2005/0071328 A1* | 3/2005 | Lawrence | .......................... | 707/3 |
| 2005/0240580 A1* | 10/2005 | Zamir et al. | ....................... | 707/4 |
| 2005/0278317 A1* | 12/2005 | Gross et al. | ......................... | 707/3 |
| 2006/0004716 A1* | 1/2006 | Hurst-Hiller et al. | .............. | 707/3 |
| 2006/0059225 A1* | 3/2006 | Stonehocker et al. | ......... | 709/202 |
| 2006/0155678 A1* | 7/2006 | Behbehani | ......... | G06F 17/30696 |
| 2007/0005679 A1* | 1/2007 | Bui et al. | ...................... | 709/201 |
| 2007/0198491 A1* | 8/2007 | Li et al. | ............................. | 707/3 |
| 2008/0021872 A1* | 1/2008 | Borrillo et al. | ..................... | 707/3 |
| 2010/0076960 A1* | 3/2010 | Sarkissian et al. | ............. | 707/722 |
| 2010/0281417 A1* | 11/2010 | Yolleck et al. | ................. | 715/779 |
| 2013/0339472 A1* | 12/2013 | Ruellan | ............... | H04L 67/2842 709/214 |

OTHER PUBLICATIONS

Teevan, Jaime, Susan T. Dumais, and Eric Horvitz. "Personalizing search via automated analysis of interests and activities." In Proceedings of the 28th annual international ACM SIGIR conference on Research and development in information retrieval, pp. 449-456. ACM, 2005.*

Xu, Yabo, Ke Wang, Benyu Zhang, and Zheng Chen. "Privacy-enhancing personalized web search." In Proceedings of the 16th international conference on World Wide Web, pp. 591-600. ACM, 2007.*

* cited by examiner

*Primary Examiner* — Frank D Mills
(74) *Attorney, Agent, or Firm* — Miles & Stockbridge P.C.

(57) ABSTRACT

A system for providing a customized list of links to content, the customized list of links provided to a user. The system receives a collection of unfiltered links to content, the collection of unfiltered links received from a server. The system hides the collection of unfiltered links from the user. The system receives parameters for customizing the collection of unfiltered links. The parameters are received from the user. The system selectively presents a customized list of links to content to the user, wherein selectively presenting the customized list of links to content comprises presenting a subset of the collection of unfiltered links in accordance with the received parameters.

18 Claims, 7 Drawing Sheets

DISPLAYING CUSTOMIZED LIST OF LINKS TO CONTENT USING CLIENT-SIDE PROCESSING

FIELD

One embodiment is directed generally to a computer system, and in particular to a computer system that provides a customized list of links to content using client-side processing.

BACKGROUND INFORMATION

Documents are generally understood as anything that may be preserved or represented in order to serve as a record for some objective. Different fields of use for documents include academic use, government use, commercial use, personal use, and public use, for example. A document used within a specific field of use may have a specific formatting standard and purpose depending upon the specific field.

To facilitate use of documents, those who prepare documents may prepare and present the information to an intended viewer in a customized manner so that the intended viewer may efficiently and effectively review the information. An intended viewer may more readily understand complex and unstructured information if the information is customized according to the needs of the intended viewer.

Although documents have traditionally been paper-based, modern electronic means allow for the storage and transfer of electronic documents. These modern electronic means include personal digital assistants ("PDA"), personal computers, audio players, and video players, for example. Although the medium for documents has changed, those who prepare documents still seek to effectively and efficiently communicate the information contained within the documents to intended viewers.

SUMMARY

One embodiment is a system for providing a customized list of links to content, the customized list of links provided to a user. The system receives a collection of unfiltered links to content, the collection of unfiltered links received from a server. The system hides the collection of unfiltered links from the user. The system receives parameters for customizing the collection of unfiltered links. The parameters are received from the user. The system selectively presents a customized list of links to the user, wherein selectively presenting the customized list of links comprises presenting a subset of the collection of unfiltered links in accordance with the received parameters.

DETAILED DESCRIPTION

Figure 1:
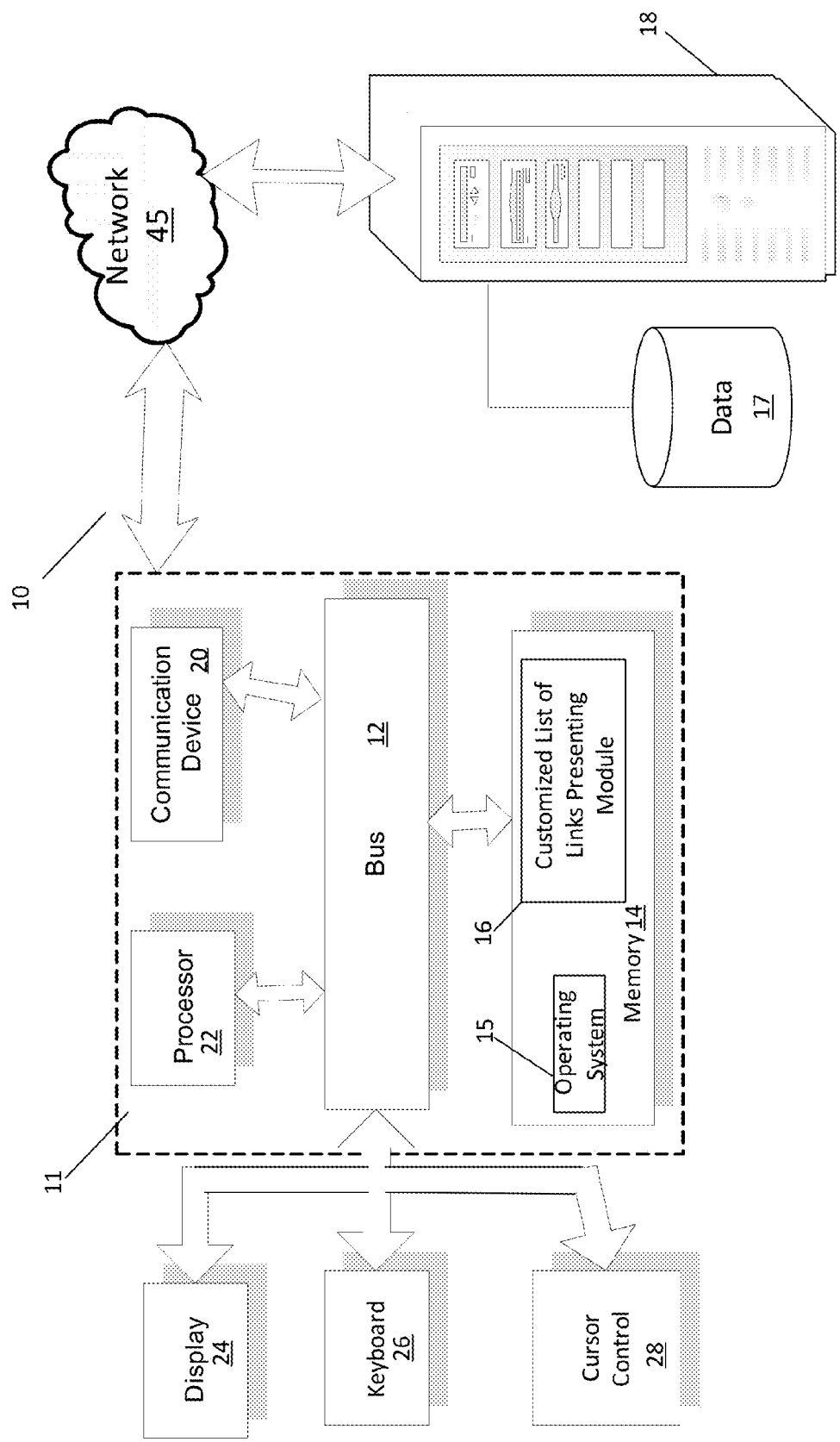
FIG. 1 is an overview block diagram of a computer system for presenting a customized list of links to content in accordance with an embodiment of the present invention.

One embodiment is a system for providing a customized list of links to content, the customized list of links provided to a user. The system allows users to provide parameters for customizing a list of links to content. The system provides a customized list of links to content by selectively presenting links to the user in accordance with the provided parameters. The system performs the selective presentation by using only client-side processing. As such, the system requires no interaction with any server while performing the selective presentation.

In previous methods for providing customized lists of links to content, a user request for customized lists of links would generally be received and handled by server-side technology. For example, in one approach, a web browser on a client computer would provide a form for collecting user information. A server would then receive the collected user information and use a server-side script engine to filter links to data stored on the server in accordance with the collected user information. As such, the server would dynamically generate a customized list of links for the user.

Another known approach for providing a customized list of links is to install an executable file (on the user's computer) that (1) executes a form for receiving user information for customizing lists of links, and then (2) provides the user information to a server for processing.

However, certain networks that store links to data, such as some networks that provide technical information, do not allow the use of server-side technology (e.g. server-side script execution) to filter the stored links in accordance with parameters provided by a user. Therefore, websites that are hosted on such networks are generally not able to provide customized lists of links based upon provided parameters.

As such, although a user may only need technical information that pertains to the user's particular software and operating environment, the user may still need to review an entire collection of highly technical information and procedures retrieved from the network because the links to data retrieved from the network are unfiltered and not customized. The user would need to review the entire collection of unfiltered links and ignore irrelevant portions of the collection of information, relying upon the user's own discretion and particular technical knowledge.

In view of the above, users of some known systems receive too much information. For example, when users request installation documentation, users prefer to receive information that applies to their particular set of software and operating environments. However, using the previous approaches, the user needs to first receive an entire collection of unfiltered links and then ignore irrelevant sections of the content on their own.

In contrast with the previous approaches, one difference between an embodiment of the present system for displaying a customized list of links to content when compared to the known systems is that unfiltered links to content representing all of the topics in a book from a server are received. Selection and presentation of the customized list of links to content (based upon a subset of the collection of unfiltered links to content) is then performed client-side as opposed to server-side. As such, certain embodiments may provide users with a customized list of links to content even if server-side processing is not allowed.

FIG. 1 is a block diagram of a computer system 10 for presenting a customized list of links to content in accordance with an embodiment of the present invention. System 10 includes client computer 11 that interfaces with server 18 via network 45. Network 45 can by any type of communication network, such as the Internet or an Intranet or other private network. Client computer 11 can be any type of device that allows a user to interface with server 18, including a laptop computer, smart phone, tablet, etc., using a wired or wireless connection, or any other method.

Client computer 11 includes a bus 12 or other communication mechanism for communicating information, and a processor 22 coupled to bus 12 for processing information. Processor 22 may be any type of general or specific purpose processor. Client computer 11 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. Client computer 11 further includes a communication device 20, such as a network interface card, to provide access to a network. Therefore, a user may interface with client computer 11 directly, or remotely through a network or any other known method.

Computer readable media may be any available media that can be accessed by processor 22 and includes both volatile and nonvolatile media, removable and non-removable media, and communication media. Communication media may include computer readable instructions, data structures, program modules or other data in a modulated data signal such as a carrier wave or other transport mechanism and includes any information delivery media.

Processor 22 may be further coupled via bus 12 to a display 24, such as a Liquid Crystal Display ("LCD"). A keyboard 26 and a cursor control device 28, such as a computer mouse, may be further coupled to bus 12 to enable a user to interface with client computer 11.

In one embodiment, memory 14 stores software modules that provide functionality when executed by processor 22. The modules include an operating system 15 that provides operating system functionality for client computer 11. The modules further include customized list of links presenting module 16 that allows a user to receive customized lists of links to content, as disclosed in more detail below.

Server 18 can be part of a larger system such as a project management system (e.g., "Primavera" from Oracle Corp.) or an enterprise resource planning ("ERP") system (e.g., "E-Business Suite" from Oracle Corp.) Therefore, server 18 will typically include one or more additional functional modules to include the additional functionality. A database 17 is coupled to server 18. Specifically, database 17 may store unfiltered data that is later customized by the customized list of links presenting module 16.

Figure 2:
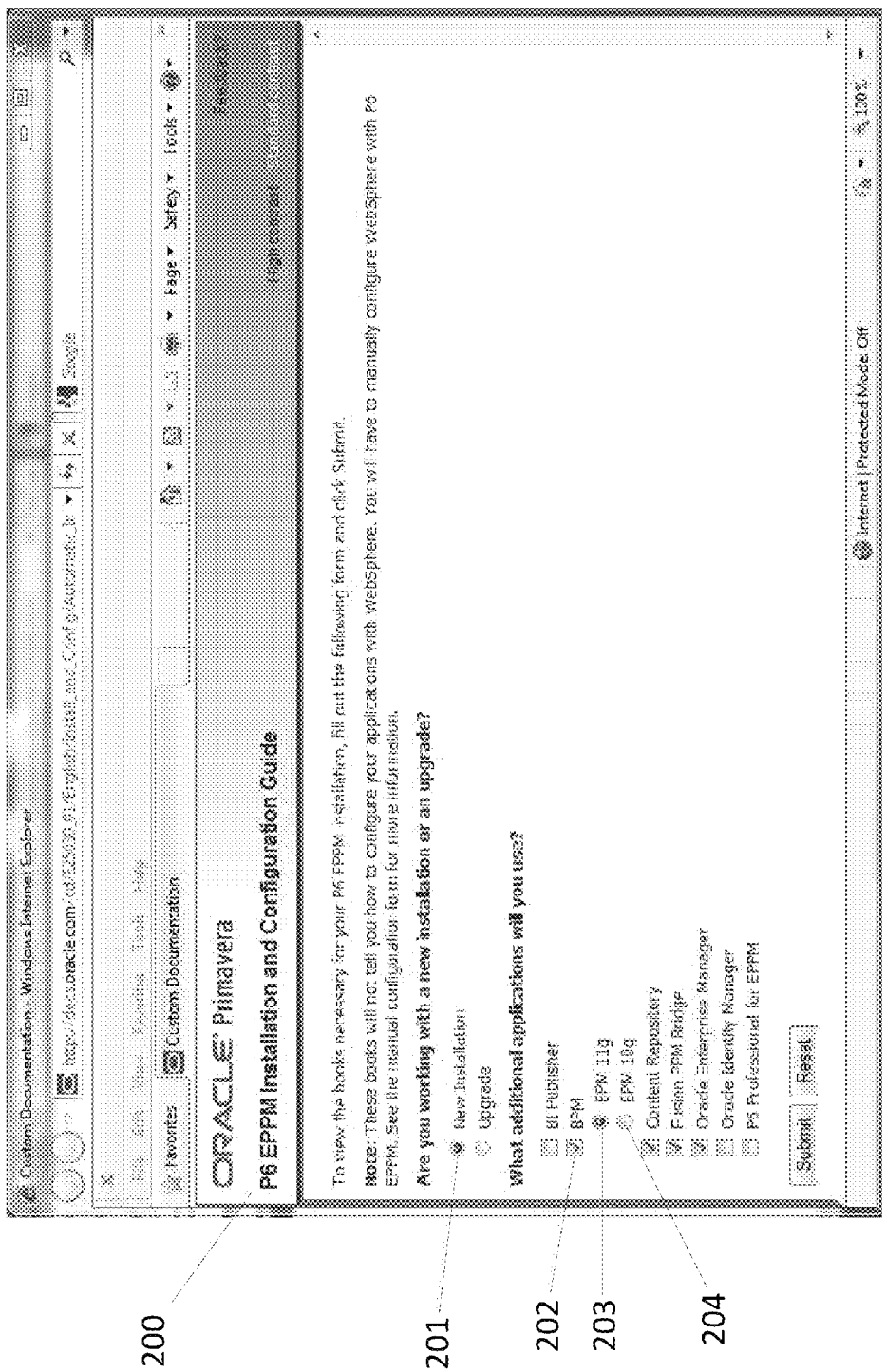
FIG. 2 is a screen shot of a user entering data via an interface to customize a list of links to content in accordance with one embodiment.

FIG. 2 is a screen shot of a user entering data via an interface 200 to customize a list of links to content in accordance with one embodiment. FIG. 2, and the screen shots of FIGS. 3-6 below, can be generated by module 16 of FIG. 1. Further, the functionality described in FIGS. 2-6 is provided by client computer 11. In an embodiment, interface 200 may comprise a hypertext markup language ("HTML") form for data entry. In certain embodiments, a user may access interface 200 by using a web browser. The user makes choices between different options by selecting check boxes 201, 202, 203, and 204 of interface 200. When the user selects certain choices, additional choices of greater specificity may be subsequently presented to the user. For example, if the user selects "BPM" using check box 202, the user is then presented additional choices for selecting "BPM 11g," corresponding to check box 203, and "BPM 10g," corresponding to check box 204. The data entered by the user may then be used as parameters for customizing lists of links to content.

Figure 3:
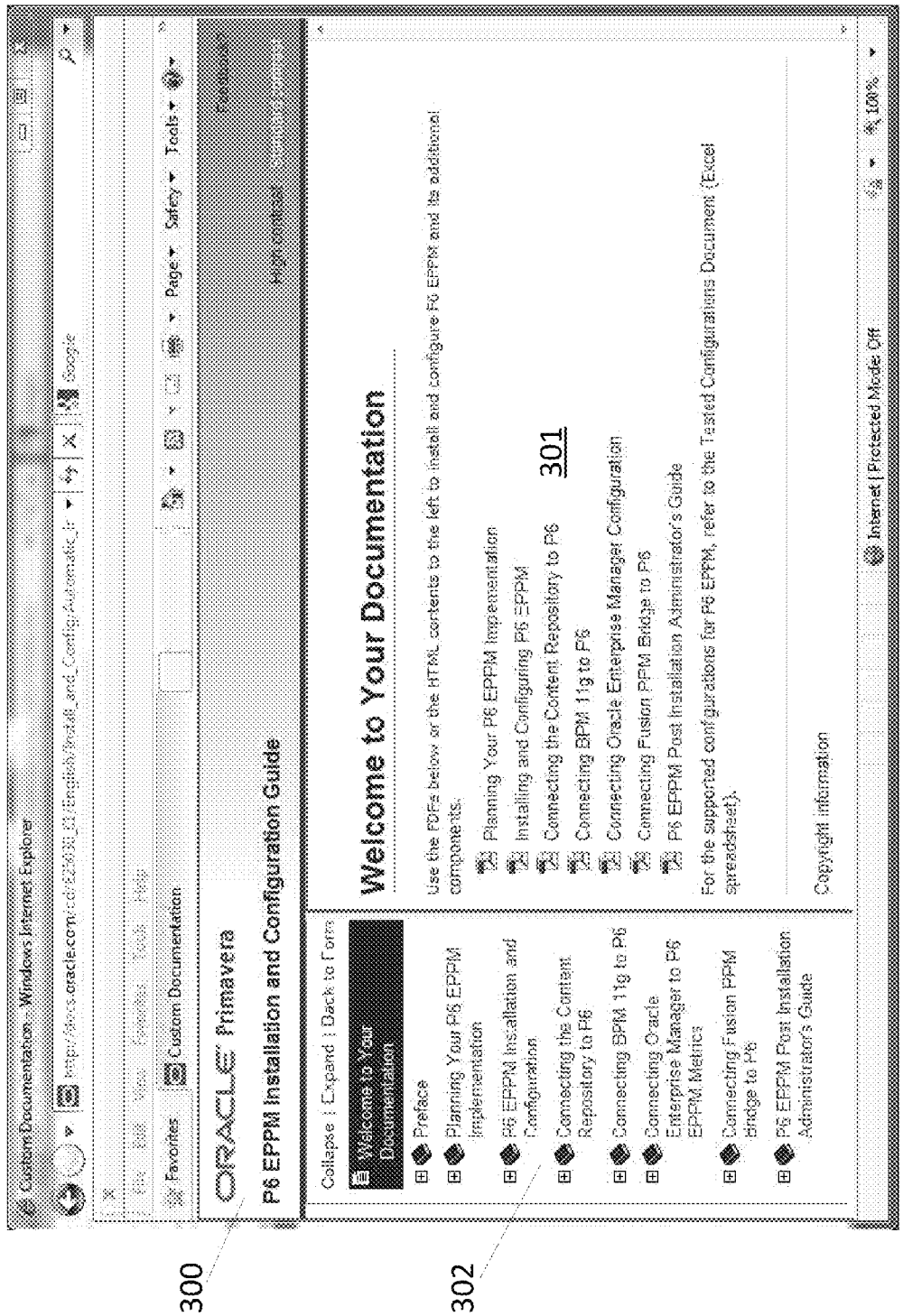
FIG. 3 is a screen shot of a user receiving a customized list of links to content via an interface in accordance with one embodiment.

FIG. 3 is a screen shot of a user receiving a customized list of links to content via an interface 300 in accordance with one embodiment. For example, in interface 300, a user receives a customized list of links to content 301. In one embodiment, the customized list of links to content may appear as a list of documents. In other embodiments, the customized list of links to content may list a single document. The customized list of links to content may be provided as a list of links to portable document format ("pdf") documents, HTML documents, MS Word documents, or any other type of electronic document. Interface 300 may also provide an expandable content guide 302 that allows a user to navigate through the customized list of links to content 301. The customized list of links to content 301 is provided in accordance to user choices made in FIG. 2, described above.

Figure 4:
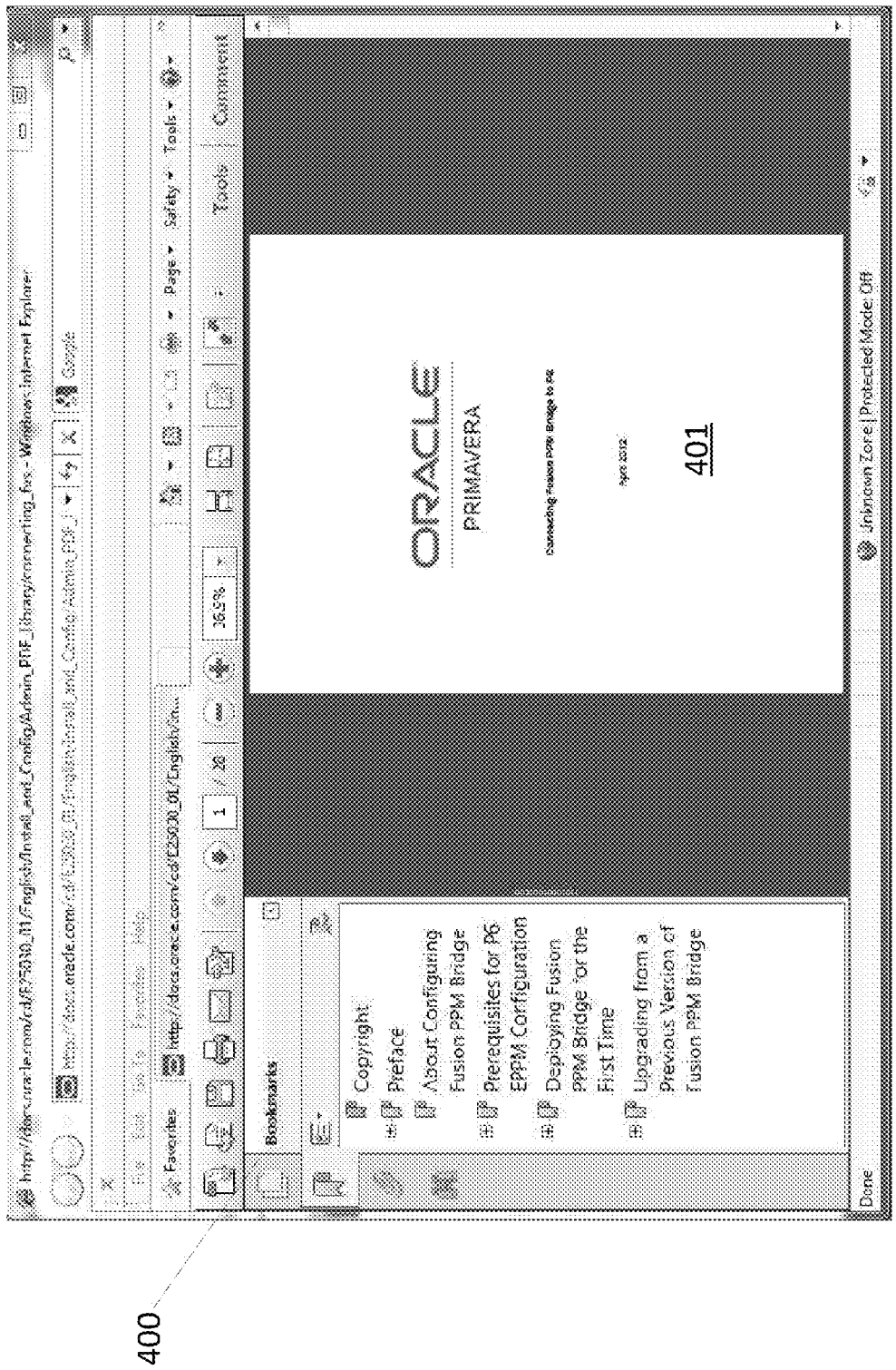
FIG. 4 is a screen shot of content as linked to by a customized list of links.

FIG. 4 is a screen shot of content as linked to by a customized list of links. For example, in interface 400, a user may review a portion of content 401, as linked to by the customized list of links to content 301 of FIG. 3.

Figure 5:
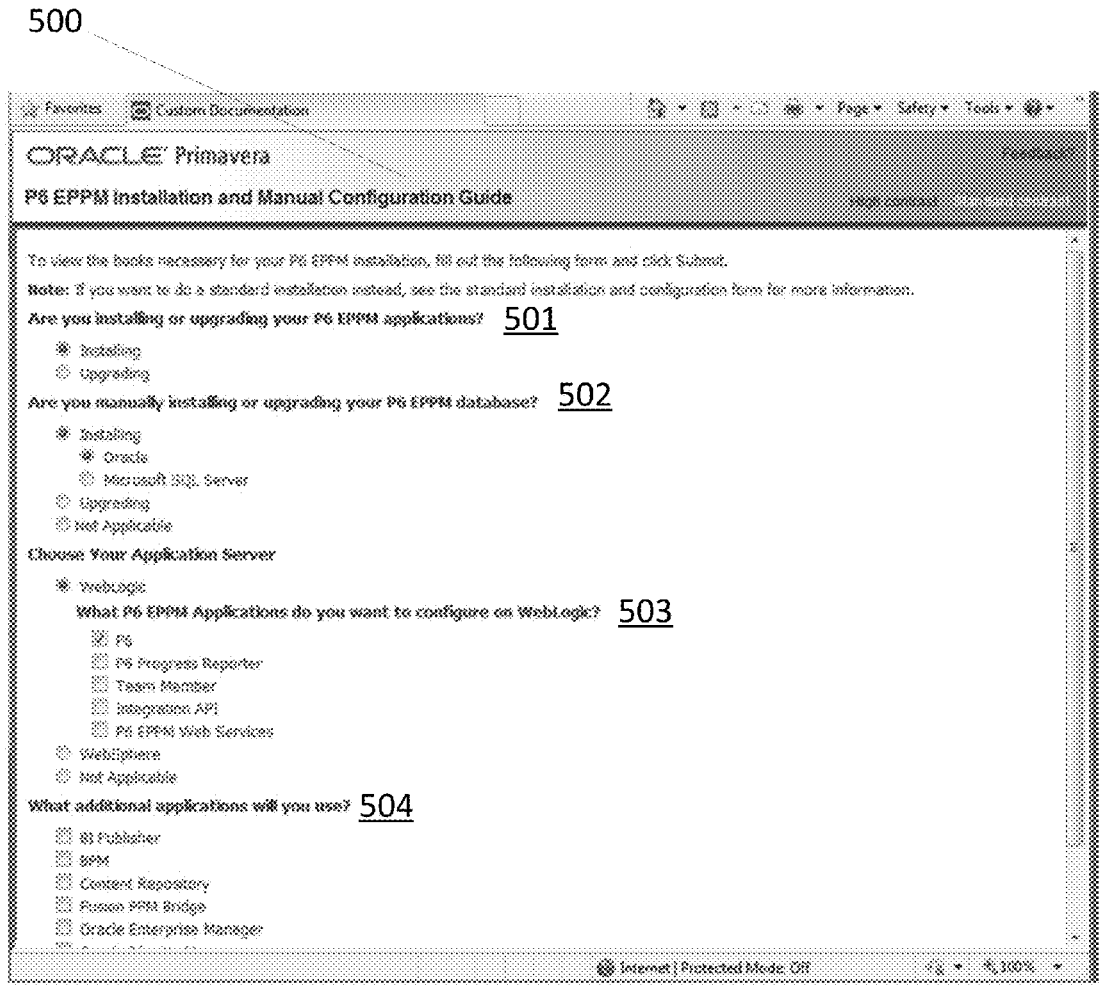
FIG. 5 is a screen shot of directed questions via an interface in accordance with one embodiment.

FIG. 5 is a screen shot of directed questions via an interface 500 in accordance with one embodiment. In certain embodiments, a user enters data to customize a list of links to content by answering a series of directed questions. For example, in user interface 500, a user answers questions 501, 502, 503, and 504 using check boxes. The data entered by the user may then be used as parameters for customizing a list of links to content.

Figure 6:
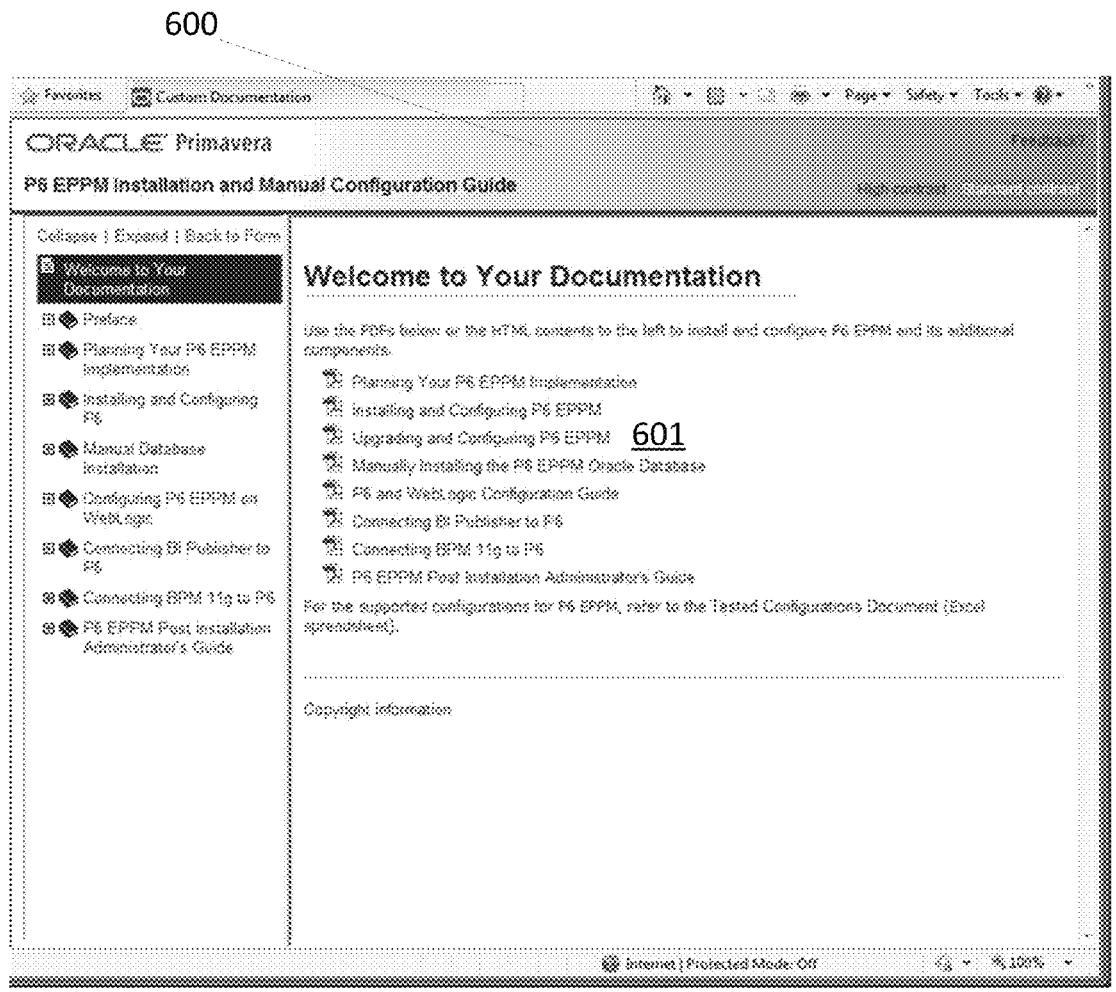
FIG. 6 is a screen shot of a user receiving a customized list of links to content via an interface in accordance with one embodiment.

FIG. 6 is a screen shot of a user receiving a customized list of links to content via an interface 600 in accordance with one embodiment. For example, in interface 600, a user receives a customized list of links to content 601, similar to customized list of links to content 301 of FIG. 3. The customized list of links to content may be provided as a list of links to pdf documents, HTML documents, MS Word documents, or any other type of electronic document. Customized list of links to content 601 is provided in accordance to user answers provided in FIG. 5 described above.

Figure 7:
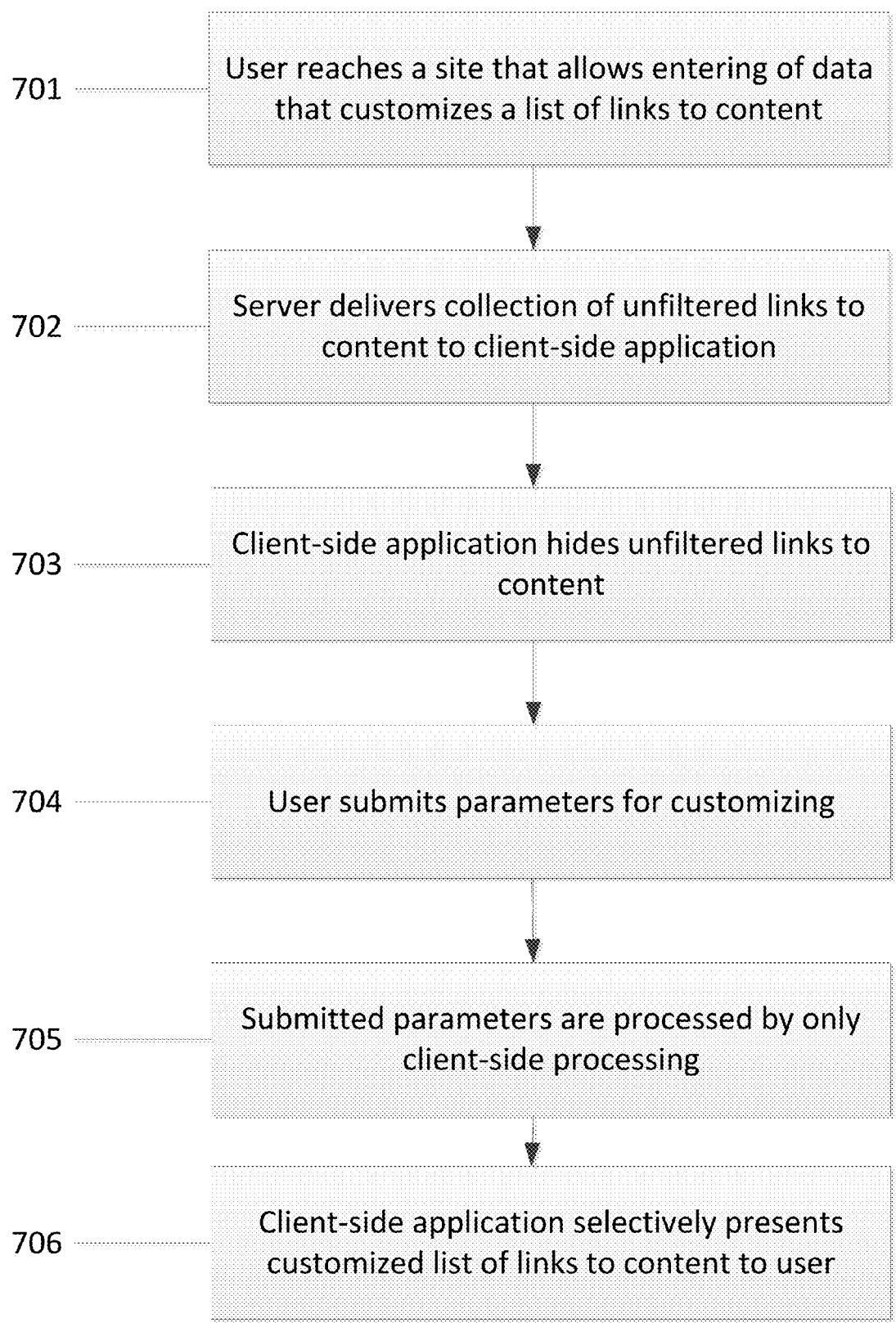
FIG. 7 is a flow diagram of the functionality of the customized-list-of-links presenting module of FIG. 1 in accordance with one embodiment.

FIG. 7 is a flow diagram of the functionality of the customized-list-of-links presenting module 16 of FIG. 1 in accordance with one embodiment. In one embodiment, the functionality of the flow diagram of FIG. 7 is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 701, a user reaches a site that allows entering of data that customizes a list of links to content. In one embodiment, the customized list of links to content links to installation documentation. As previously described, a user may enter information via various interfaces (e.g. interfaces 200, 300, and 500 of FIGS. 2, 3, and 5, respectively) accessed by client computer 11 of FIG. 1.

At 702, a server delivers a collection of unfiltered links to content to a client-side application. For example, client computer 11 of FIG. 1 may prompt downloading of an HTML page with an entire collection or substantially an entire collection of unfiltered links to content from the server.

In certain embodiments, the unfiltered links to content from the server are unfiltered HTML links or links of a similar markup language. The unfiltered HTML links may include a tree structure of HTML links and HTML pages. Each HTML node of the tree structure is identified with an identifier attribute that uniquely identifies the node. Each HTML link is also identified with an identifier attribute that uniquely identifies the link. When expanded, each HTML node displays HTML links that were nested in that node.

At 703, the client-side application hides the unfiltered links provided by the server. Although the client-side application has received the entire collection or substantially an entire collection of unfiltered links, the client-side application does not display all of the received unfiltered links to the user, thus sparing the user from being overloaded with information. 703 is performed by client computer 11 of FIG. 1 and requires no interaction with the server.

In certain embodiments, the client-side application hides the unfiltered links using an HTML form that overlays the unfiltered links. As such, the form covers and hides portions of the unfiltered links. In one embodiment, the form that covers and hides portions of the unfiltered links is the same form as the form used to receive user information for customizing lists of links to content (as may be comprised by interface 200 of FIG. 2).

At 704, the user enters information for customizing lists of links to content into various interfaces (e.g. by using interfaces 200, 300, and 500). The information may be used as parameters for determining which portions of the unfiltered links are relevant to the user. 704 is performed on client computer 11 of FIG. 1 and requires no interaction with the server.

At 705, the parameters are processed to determine a subset of the collection of unfiltered links that will be presented to the user, thus preparing a customized list of links to content for the user. The processing is performed entirely by client-side processing, without relying upon any server-side processing. 705 is performed on client computer 11 of FIG. 1 and requires no interaction with the server.

In some embodiments, after receiving the parameters for customizing lists of links to content, the parameters are processed by JavaScript on the client-side computer and stored within an electronic cookie. The client-side processing is performed without needing to transmit any information back to the server.

In some embodiments, the client-side processing is performed using JavaScript and cascading style sheets ("CSS") to simulate server-side processing. Because JavaScript is used, certain embodiments do not need to install any additional executable file on the user's computer for performing the client-side processing. After an HTML form covers and hides the unfiltered HTML links to content, JavaScript runs on the client-side application to hide appropriate nodes of the tree structure of the unfiltered HTML links to content (e.g., hiding appropriate table of content nodes). Based on the stored information within the electronic cookie, the unfiltered links to content and tree structure are hidden via CSS and JavaScript. The HTML form (that is overlaid over the unfiltered links) is then itself hidden, revealing the HTML links corresponding to customized links to content.

At 706, the client-side application selectively presents the prepared customized list of links to the user (e.g. by interfaces 300 and 600). 706 is performed on client computer 11 and requires no interaction with the server.

As described above, certain embodiments are directed to a system for providing a customized list of links to content, the customized list of links provided to a user. The system allows users to provide parameters for customizing lists of links to content. The system provides a customized list of links by selectively presenting links to the user in accordance with the provided parameters. The system performs the selective presentation by using only client-side processing. As such, the system requires no interaction with any server while performing the selective presentation.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A non-transitory computer readable medium having instructions stored thereon that, when executed by a processor, cause the processor to provide a customized list of links to content, the customized list of links provided to a user, the providing comprising:
   receiving at a client computer a collection of unfiltered links to content, the collection of unfiltered links received from a server;
   hiding the collection of unfiltered links from the user;
   receiving parameters for customizing the collection of unfiltered links at the client computer, the parameters generated by the user and received from the user after the client computer receives the collection of unfiltered links; and
   selectively presenting a customized list of links to content to the user, wherein selectively presenting the customized list of links to content comprises determining at the client computer without interaction with the server a subset of the collection of unfiltered links in accordance with the received parameters.

2. The computer readable medium of claim 1, wherein the server does not allow server-side script execution.

3. The computer readable medium of claim 1, wherein the hiding of the collection of unfiltered links, the receiving parameters, and the selectively presenting the customized list of links to content are performed without requiring any interaction with the server.

4. The computer readable medium of claim 1, wherein the collection of unfiltered links and the customized list of links link to documentation for software installation.

5. The computer readable medium of claim 1, wherein the determining at the client computer without interaction with the server is performed using JavaScript.

6. The computer readable medium of claim 1, wherein the parameters are received through a hypertext markup language form.

7. A method for providing a customized list of links to content, the customized list of links provided to a user, the method comprising:
   receiving at a client computer a collection of unfiltered links to content, the collection of unfiltered links received from a server;
   hiding the collection of unfiltered links from the user;
   receiving parameters for customizing the collection of unfiltered links at the client computer, the parameters generated by the user and received from the user after the client computer receives the collection of unfiltered links; and
   selectively presenting a customized list of links to content to the user, wherein selectively presenting the customized list of links to content comprises determining at the client computer without interaction with the server a subset of the collection of unfiltered links in accordance with the received parameters.

8. The method of claim 7, wherein the server does not allow server-side script execution.

9. The method of claim 7, wherein the hiding of the collection of unfiltered links, the receiving parameters, and the selectively presenting the customized list of links content are performed without requiring any interaction with the server.

10. The method of claim 7, wherein the collection of unfiltered links and the customized list of links link to documentation for software installation.

11. The method of claim 7, wherein the determining at the client computer without interaction with the server is performed using JavaScript.

12. The method of claim 7, wherein the parameters are received through a hypertext markup language form.

13. A system for providing a customized list of links to content, the customized list of links provided to a user, the system comprising:
- a processor;
- a memory coupled to the processor;
- a first receiving module that receives at a client computer a collection of unfiltered links to content, the collection of unfiltered links received from a server;
- a hiding module that hides the collection of unfiltered links from the user;
- a second receiving module that receives parameters for customizing the collection of unfiltered links at the client computer, the parameters generated by the user and received from the user after the client computer receives the collection of unfiltered links; and
- a presenting module that selectively presents a customized list of links to content to the user, wherein selectively presenting the customized list of links to content comprises determining at the client computer without interaction with the server a subset of the collection of unfiltered links in accordance with the received parameters.

14. The system of claim 13, wherein the server does not allow server-side script execution.

15. The system of claim 13, wherein the hiding of the collection of unfiltered links, the receiving parameters, and the selectively presenting the customized list of links to content are performed without requiring any interaction with the server.

16. The system of claim 13, wherein the collection of unfiltered links and the customized list of links link to documentation for software installation.

17. The system of claim 13, wherein the determining at the client computer without interaction with the server is performed using JavaScript.

18. The system of claim 13, wherein the parameters are received through a hypertext markup language form.

\* \* \* \* \*